(No Model.)
E. SIROIS.
APPARATUS FOR SHOEING ANIMALS.
No. 502,054. Patented July 25, 1893.
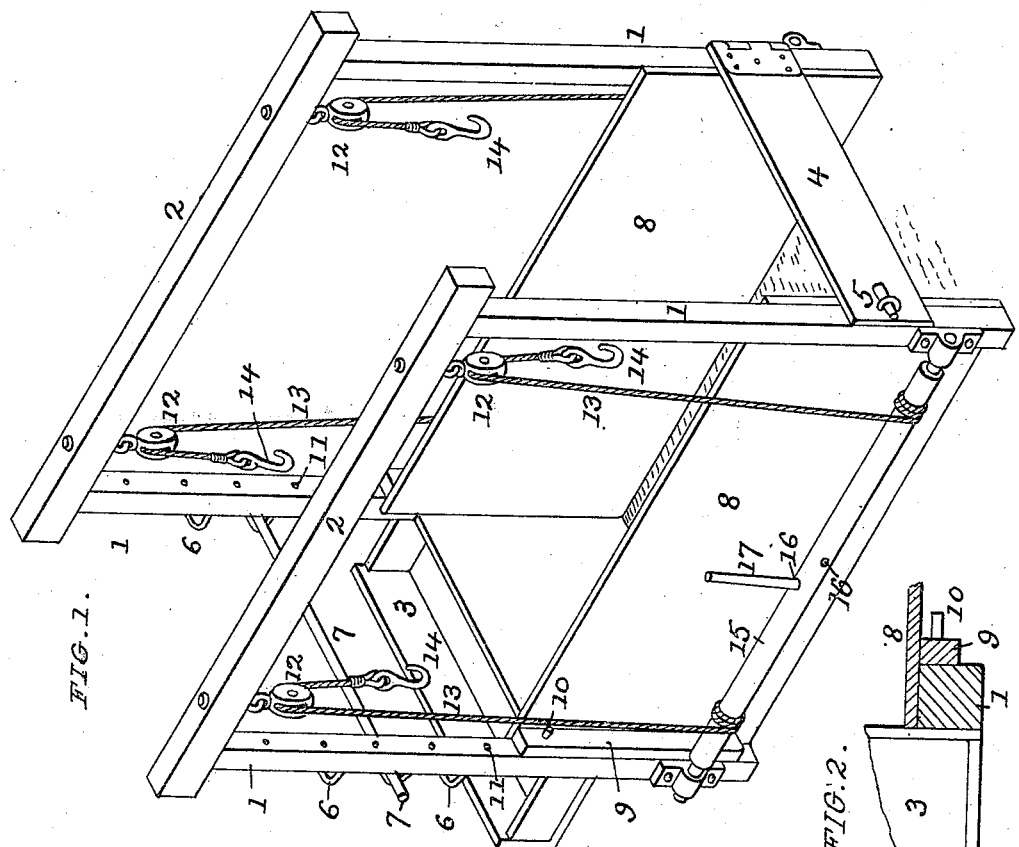
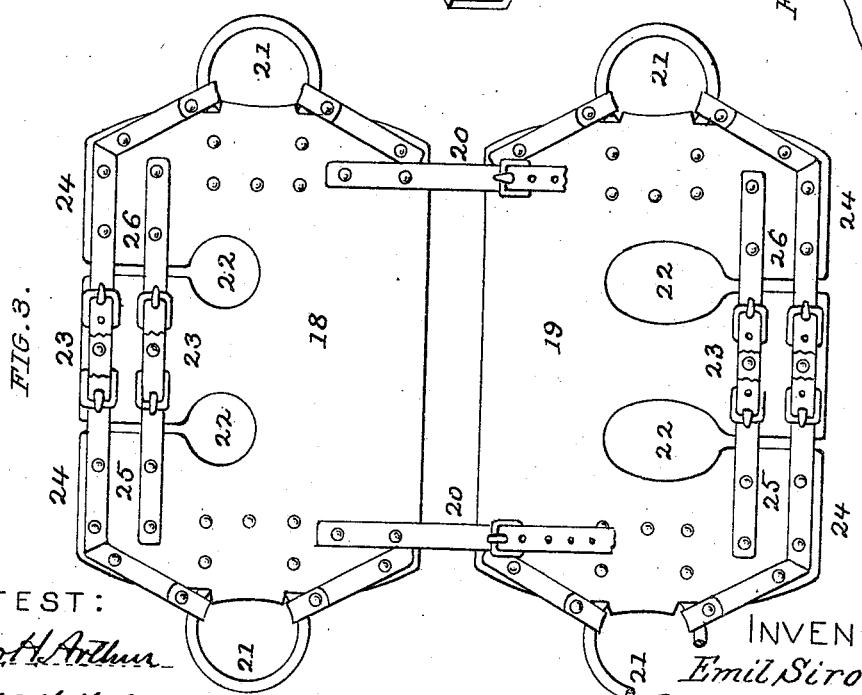
ATTEST:
Geo. H. Arthur
M. H. Holmes
INVENTOR:
Emil Sirois,
by Robert Burns Atty.

UNITED STATES PATENT OFFICE.

EMIL SIROIS, OF SHELBY, INDIANA.

APPARATUS FOR SHOEING ANIMALS.

SPECIFICATION forming part of Letters Patent No. 502,054, dated July 25, 1893.

Application filed February 18, 1893. Serial No. 462,905. (No model.)

*To all whom it may concern:*

Be it known that I, EMIL SIROIS, a citizen of the United States, residing at Shelby, in the county of Lake and State of Indiana, have invented certain new and useful Improvements in Apparatus for Shoeing Animals; and I do hereby declare the following to be a full, clear, and exact description of the same, reference being had to the accompanying drawings, forming part of this specification.

The present invention relates to that class of horse shoeing apparatus in which a sling and elevating mechanism are employed to raise the horse off the ground, for convenience during the shoeing operation and the avoidance of all danger from the kicking, &c., of a vicious or unruly animal.

The object of the present improvement is to provide, a simple, durable and effective elevating harness capable of adjustment to any sized animal, and in which the lifting strain is evenly distributed over the whole body of the animal. I attain such object by the construction and arrangement of parts illustrated in the accompanying drawings in which—

Figure 1, is an isometrical perspective view of an animal inclosing stall adapted for use in connection with my present invention; Fig. 2, an enlarged detail horizontal section of a front corner of the same; and, Fig. 3, a plan view of my improved elevating harness or sling.

Similar numerals of reference indicate like parts in the several views.

As represented in the drawings, the stall will consist of four corner uprights or posts 1, connected at their top in pairs by longitudinal rails 2; at the front by a feed box or trough 3, and at the rear by the transverse bar or gate 4 hinged to one post and having a fastening means 5 on the opposite post. This gate or bar is arranged a short distance above the floor, so that its top will afford a rest for that foot of the animal that is being shod, and at the same time safely confine the other from any dangerous backward kicking movement. At the front of the stall, the posts are provided with the vertical series of eyes 6, for the reception at different heights of the transverse pole or rod 7, which engages over the neck of the horse to prevent the throwing backward of the head, a usual preliminary to the act of rearing in a horse. The sides of the stalls are formed by the panels 8, having vertical end cleats 9, by which they are arranged to slide vertically on the posts 1, and be secured at their vertical adjustment thereon by means of the holding pins 10 passing through said cleats into one of the vertical series of holes 11, in the main posts or uprights. These sides when lowered constitute a closed stall and are capable of ready vertical raising to admit of convenient access to the side of the animal at which it is desired to operate. The longitudinal top rails 2, afford attachment for the pairs of pulley blocks 12, of the hoisting or elevating ropes 13, at each side of the stall, the free ends of which are provided with hooks 14, for ready engagement with the animal lifting harness, hereinafter described.

15, are the windlasses or drums for the hoisting ropes 13, arranged in bearings near the bottom of the posts, and having circumferential series of capstan holes 16, in which engages the winding lever or bar 17 in operating the windlasses, or in locking the same to its adjustment.

The elevating harness or sling, will consist of front and rear sections 18 and 19, of substantially counterpart construction, and adjustably connected together by buckles and straps 20, so as to adjust the harness in length to suit different lengths of animals. Each harness section will consist of a substantially rectangular sheet of leather or heavy canvas, at the sides of which are secured in a strong and suitable manner, the suspension rings or eyes 21, by which engagement is effected with the hooks 14 of the hoisting ropes 13, of the before described shoeing stall. Each section is provided with a pair of laterally arranged openings or orifices 22, for the passage of the front and hind feet respectively of the animal, and from these openings, the front section will be cut in a forward direction, and the rear section in a backward direction, to form the central end member 23, and the lateral end members 24, that are adjustable with relation to each other by buckles and straps 25, 26, so that they will cause the harness to adapt itself to particular sizes and forms of the animal being operated on, and cause the strain in lifting to be evenly distributed over the whole surface of the animal's body; by this means any danger of injury is avoided from local strains exerted against a particular portion of the body of the animal.

Having thus fully described my said invention, what I claim as new, and desire to secure by Letters Patent, is—

1. The combination with the hoisting ropes of a shoeing stall, of the hoisting harness or sling composed of sections 18 and 19, having foot orifices 22, adjusting buckles and straps 20, 25, 26, and suspension rings 21, substantially as set forth.

2. The combination with the hoisting ropes of a shoeing stall, of the hoisting harness or sling composed of sections 18 and 19, having foot orifices 22 slitted so as to form the central and lateral end members 23, 24, adjusting buckles and straps 20, 25, 26, and suspension rings 21, substantially as set forth.

In testimony whereof witness my hand this 3d day of February, 1893.

EMIL SIROIS.

In presence of—
LEMUEL D. PARMLEY,
GEO. H. ARTHUR.